US010632548B2

United States Patent
Men

(10) Patent No.: US 10,632,548 B2
(45) Date of Patent: Apr. 28, 2020

(54) TRIANGULAR-SHAPED INDEXABLE CUTTING INSERT HAVING RECESSED SIDE SURFACES AND ROTARY CUTTING TOOL

(71) Applicant: Iscar, Ltd., Tefen (IL)

(72) Inventor: Yuri Men, Haifa (IL)

(73) Assignee: Iscar, Ltd., Tefen (IL)

( * ) Notice: Subject to any disclaimer, the term of this patent is extended or adjusted under 35 U.S.C. 154(b) by 85 days.

(21) Appl. No.: 16/162,950

(22) Filed: Oct. 17, 2018

(65) Prior Publication Data

US 2019/0151964 A1    May 23, 2019

Related U.S. Application Data

(60) Provisional application No. 62/588,461, filed on Nov. 20, 2017.

(51) Int. Cl.
  *B23C 5/20* (2006.01)
  *B23C 5/06* (2006.01)
  (Continued)

(52) U.S. Cl.
  CPC ............. *B23C 5/207* (2013.01); *B23C 5/109* (2013.01); *B23C 5/223* (2013.01); *B23C 5/2213* (2013.01);
  (Continued)

(58) Field of Classification Search
  CPC .... B23C 2200/0416; B23C 2200/0483; B23C 2200/081; B23C 2200/125;
  (Continued)

(56) References Cited

U.S. PATENT DOCUMENTS 6,527,485 B1   3/2003   Little
8,777,524 B2   7/2014   Choi et al.
(Continued)

FOREIGN PATENT DOCUMENTS

CN    103506680 A    1/2014
EP       2213399       8/2010
(Continued)

OTHER PUBLICATIONS

International Search Report dated Feb. 19, 2019, issued in PCT counterpart application (No. PCT/IL2018/051126).
(Continued)

*Primary Examiner* — Nicole N Ramos
(74) *Attorney, Agent, or Firm* — Womble Bond Dickinson (US) LLP

(57) ABSTRACT

An indexable cutting insert has opposing upper and lower end surfaces, and a peripheral surface including three side surfaces circumferentially alternating with three corner surfaces. The three side surfaces define an imaginary triangle and an imaginary hexagon. Each corner surface intersects the upper end surface to form an upper corner peripheral edge having a primary cutting edge. In a top view, each triangle side traverses two upper corner peripheral edges, imaginary lines tangential to the end points of each primary cutting edge are either collinear or form an obtuse angle greater than 175 degrees, each primary cutting edge has a primary length greater than half the hexagon side length, and at least one triangle side traverses each primary cutting edge. The insert is removably secured in a rotary cutting tool such that one of the upper corner peripheral edges contains an axially forwardmost point of the insert's upper peripheral edge.

24 Claims, 11 Drawing Sheets

(51) Int. Cl.
*B23C 5/22* (2006.01)
*B23C 5/10* (2006.01)

(52) U.S. Cl.
CPC ......... *B23C 2200/0416* (2013.01); *B23C 2200/0483* (2013.01); *B23C 2200/081* (2013.01); *B23C 2200/125* (2013.01); *B23C 2200/168* (2013.01); *B23C 2200/201* (2013.01); *B23C 2200/203* (2013.01); *B23C 2200/286* (2013.01); *B23C 2200/361* (2013.01); *B23C 2210/163* (2013.01); *B23C 2210/168* (2013.01); *B23C 2210/203* (2013.01); *B23C 2210/503* (2013.01)

(58) Field of Classification Search
CPC ........ B23C 2200/168; B23C 2200/201; B23C 2200/203; B23C 2200/286; B23C 2200/361; B23C 2200/369; B23C 2200/0477; B23C 2200/128; B23C 2200/365; B23C 2200/367; B23C 2210/163; B23C 2210/168; B23C 2210/203; B23C 2210/503; B23C 5/109; B23C 5/207; B23C 5/2213; B23C 5/223; B23C 5/2247; B23C 5/2221
See application file for complete search history.

(56) References Cited

U.S. PATENT DOCUMENTS

| | | |
|---|---|---|
| 2003/0180103 A1 | 9/2003 | Nagaya et al. |
| 2010/0329800 A1 | 12/2010 | Edler et al. |
| 2011/0305531 A1 | 12/2011 | Amstibovitsky et al. |
| 2012/0201622 A1* | 8/2012 | Kocherovsky ......... B23B 29/02 409/131 |
| 2013/0108387 A1* | 5/2013 | Ishi ...................... B23C 5/207 409/132 |
| 2013/0129433 A1* | 5/2013 | Matsumoto ............ B23C 5/08 407/51 |
| 2013/0251464 A1 | 9/2013 | Hecht |
| 2013/0294850 A1 | 11/2013 | Park |
| 2014/0076117 A1* | 3/2014 | Shibata ................. B23C 5/06 83/13 |
| 2015/0202697 A1 | 7/2015 | Shiota et al. |
| 2015/0246398 A1 | 9/2015 | Kawasaki |
| 2016/0082519 A1 | 3/2016 | Hecht |
| 2016/0082528 A1 | 3/2016 | Ballas |
| 2016/0107248 A1 | 4/2016 | Smycek |
| 2017/0216940 A1 | 8/2017 | Aso |
| 2018/0001400 A1* | 1/2018 | Men ..................... B23C 5/2247 |
| 2019/0255628 A1* | 8/2019 | Goto ...................... B23C 5/08 |

FOREIGN PATENT DOCUMENTS

| | | | |
|---|---|---|---|
| JP | 2006-075913 | 3/2006 | |
| WO | WO-2017170403 A1 * | 10/2017 | ............... B23C 5/08 |

OTHER PUBLICATIONS

Written Opinion dated Feb. 19, 2019, issued in PCT counterpart application (No. PCT/IL2018/051126).

* cited by examiner

TRIANGULAR-SHAPED INDEXABLE CUTTING INSERT HAVING RECESSED SIDE SURFACES AND ROTARY CUTTING TOOL

RELATED APPLICATIONS

This application claims priority to U.S. Provisional Patent Application No. 62/588,461 filed 20 Nov. 2017, the contents of which are incorporated by reference in their entirety

FIELD OF THE INVENTION

The present invention relates to a cutting tool and a triangular shaped indexable cutting insert therefor, for use in metal cutting processes in general, and for milling operations in particular.

BACKGROUND OF THE INVENTION

Within the field of cutting tools used in milling operations, there are some examples of triangular-shaped indexable cutting inserts having recessed side surfaces, removably retained in an insert receiving pocket of a cutting body.

CN 103506680 discloses a triangular shaped indexable cutting insert having opposing upper and lower end surfaces with a peripheral surface extending therebetween, the peripheral surface including three side surfaces and three corner surfaces, each corner surface intersecting an upper end surface to form a curved upper cutting edge, and each side surface having a recessed side surface.

US 2016/0107248 discloses a triangular shaped indexable cutting insert having opposing upper and lower end surfaces with a peripheral surface extending therebetween, the peripheral surface including three side surfaces and three corner surfaces, each corner surface intersecting an upper end surface to form an upper cutting edge. Each upper cutting edge includes a radiused component having a first end and a second end and first and second components at the first and the second ends of the radiused component, respectively, the first and second components being less curved than the radiused component. The lower end surface includes three radially extending mounting grooves, and each side surface includes at least one substantially V-shaped valley formed by first and second support surfaces.

US 2010/0329800 discloses a double-sided indexable cutting insert having three heads spaced apart by an intermediate part, each head including a front portion, both sides of which have two essentially straight cutting edges converging at a nose edge, and a rear portion which has two side contact surfaces. The intermediate part has three 'recessed' intermediate surfaces, which in a top view or a bottom view of the cutting insert define an imaginary triangle, none of the imaginary sides of which traverse any of the cutting edges.

SUMMARY OF THE INVENTION

In accordance with the present invention, there is provided an indexable triangular-shaped cutting insert having features designed in an effort to satisfy one or more of the aforementioned needs in the field. The cutting insert, under one aspect of the invention, comprising:

opposing upper and lower surfaces with a peripheral surface extending therebetween and a central axis extending therethrough,
the lower surface having a downward facing planar base surface defined by a first horizontal plane perpendicular to the central axis,
the peripheral surface intersecting the upper surface to form a continuous upper peripheral edge and having three side surfaces circumferentially alternating with three corner surfaces,
each corner surface intersecting the upper surface to form an upper corner peripheral edge, and each upper corner peripheral edge having a primary cutting edge extending from a first end point to a second end point,
wherein in a cross-section taken in a second horizontal plane perpendicular to the central axis and intersecting the three side surfaces, the three side surfaces define three sides of a first imaginary triangle and three non-adjacent sides of a first imaginary hexagon, and
wherein in a top view of the cutting insert:
each side of the first imaginary triangle traverses two upper corner peripheral edges,
first and second imaginary straight lines tangential to each primary cutting edge at its first and second end points, respectively, are either collinear or form an obtuse primary bend angle of greater than 175 degrees,
each primary cutting edge has a primary length between its first and second end points greater than half the hexagon side length of the first imaginary hexagon, and
at least one side of the first imaginary triangle traverses each primary cutting edge.

Also in accordance with the present invention, there is provided a rotary cutting tool rotatable about a tool axis defining a forward-rearward direction, and comprising a cutting body having at least one insert receiving pocket, and at least one cutting insert of the sort described above removably secured in the insert receiving pocket.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
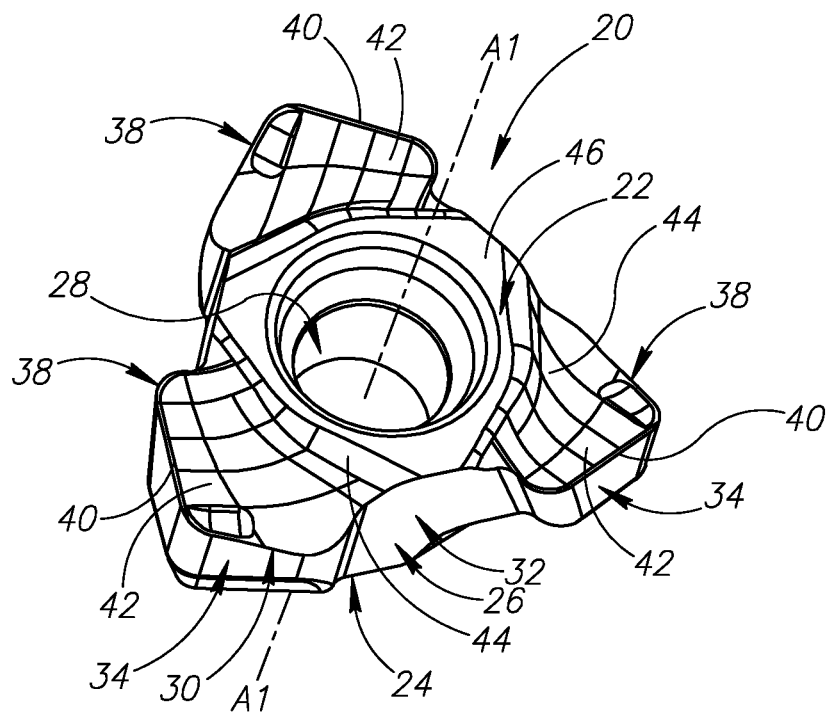
FIG. 1 is a perspective view of a cutting insert in accordance with a first embodiment of the present invention.

As shown in FIGS. 1 to 4 and 9 to 12, a first aspect of the present invention relates to an indexable triangular shaped cutting insert 20, 120 having opposing upper and lower surfaces 22, 24 with a peripheral surface 26 extending therebetween and a central axis A1 extending therethrough.

FIGS. 1 to 4 show a first embodiment cutting insert 20 suitable for milling operations at high feed rates.

FIGS. 9 to 12 show a second embodiment cutting insert 120 suitable for milling a square shoulder in a workpiece.

It should be appreciated that throughout the description and claims, the same reference numerals have been used for features that are common to both the first and second embodiment cutting inserts 20, 120.

In some embodiments of the present invention, the cutting insert 20, 120 may be indexable about the central axis A1.

Also in some embodiments of the present invention, the cutting insert 20, 120 may exhibit three-fold rotational symmetry about the central axis A1.

Further in some embodiments of the present invention, a central bore 28 coaxial with the central axis A1 may intersect the upper and lower surfaces 22, 24.

Yet further in some embodiments of the present invention, the cutting insert 20, 120 may preferably be manufactured by form pressing and sintering a cemented carbide, such as tungsten carbide, and may be coated or uncoated.

As shown in FIGS. 1, 2, 9 and 10, the peripheral surface 26 intersects the upper surface 22 to form a continuous upper peripheral edge 30, and has three side surfaces 32 circumferentially alternating with three corner surfaces 34.

In some embodiments of the present invention, each side surface 32 may be planar and parallel to the central axis A1.

Figure 3:
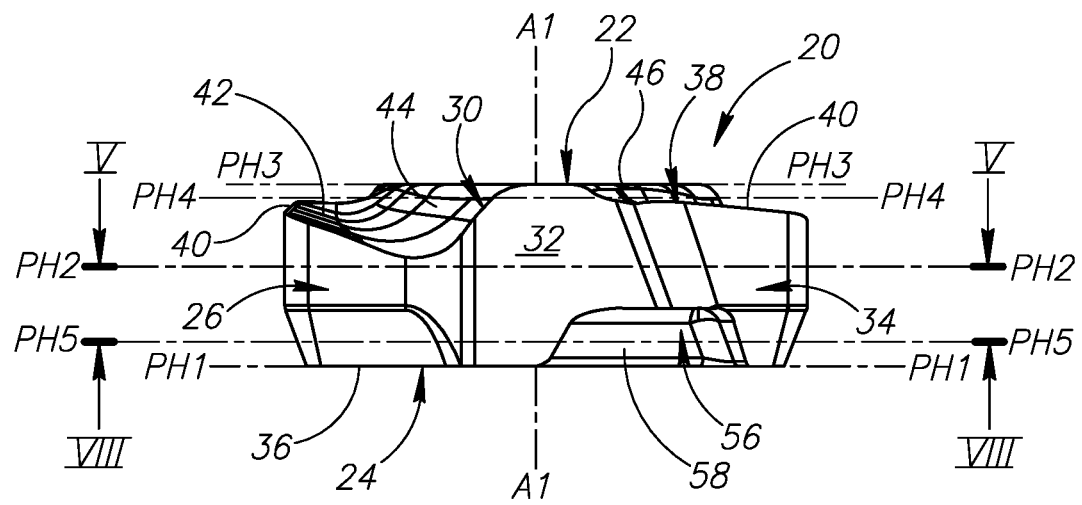
FIG. 3 is a side view of the cutting insert shown in FIG. 1.
Figure 11:
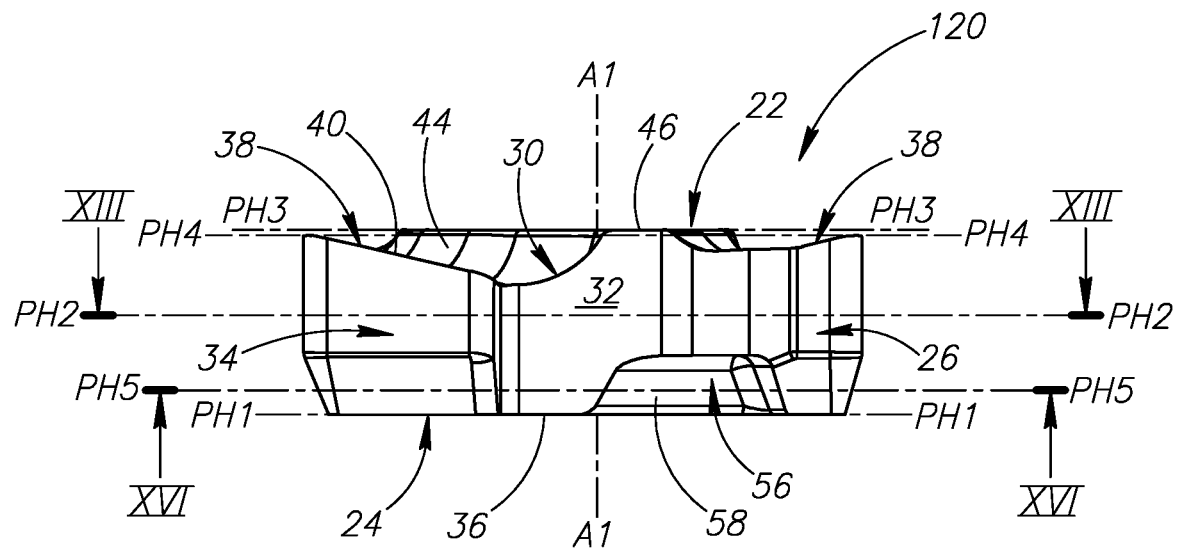
FIG. 11 is a side view of the cutting insert shown in FIG. 9.

As shown in FIGS. 3 and 11, the lower surface 24 has a downward facing planar base surface 36 defined by a first horizontal plane PH1 perpendicular to the central axis A1.

In some embodiments of the present invention, each side surface 32 may intersect the base surface 36.

In other embodiments of the present invention (not shown), the base surface 36 may include a plurality of coplanar base sub-surfaces.

As shown in FIGS. 1 to 3 and 9 to 11, each corner surface 34 intersects the upper surface 22 to form an upper corner peripheral edge 38, and each upper corner peripheral edge 38 has a primary cutting edge 40 extending from a first end point N1 to a second end point N2.

In some embodiments of the present invention, each primary cutting edge 40 may slope downwardly from its first end point N1 to its second end point N2.

Also in some embodiments of the present invention, each primary cutting edge 40 may slope continuously downwardly from its first end point N1 to its second end point N2.

Further in some embodiments of the present invention, the lower surface 24 may be devoid of cutting edges, and the cutting insert 20, 120 may be described a 'single-sided'.

Figure 5:
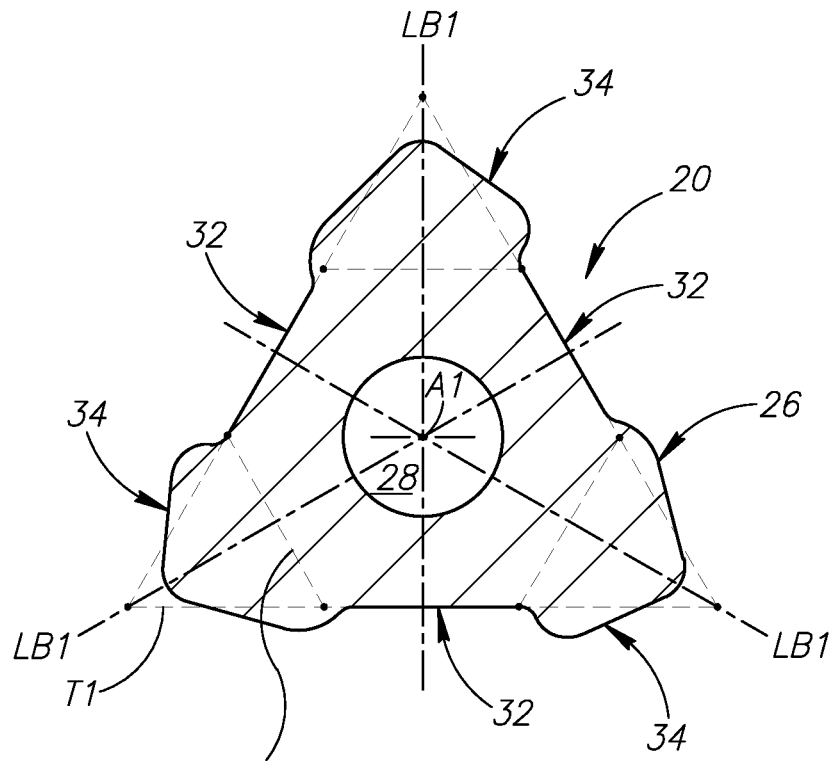
FIG. 5 is a cross-sectional view of the cutting insert shown in FIG. 3, taken along the line V-V.
Figure 13:
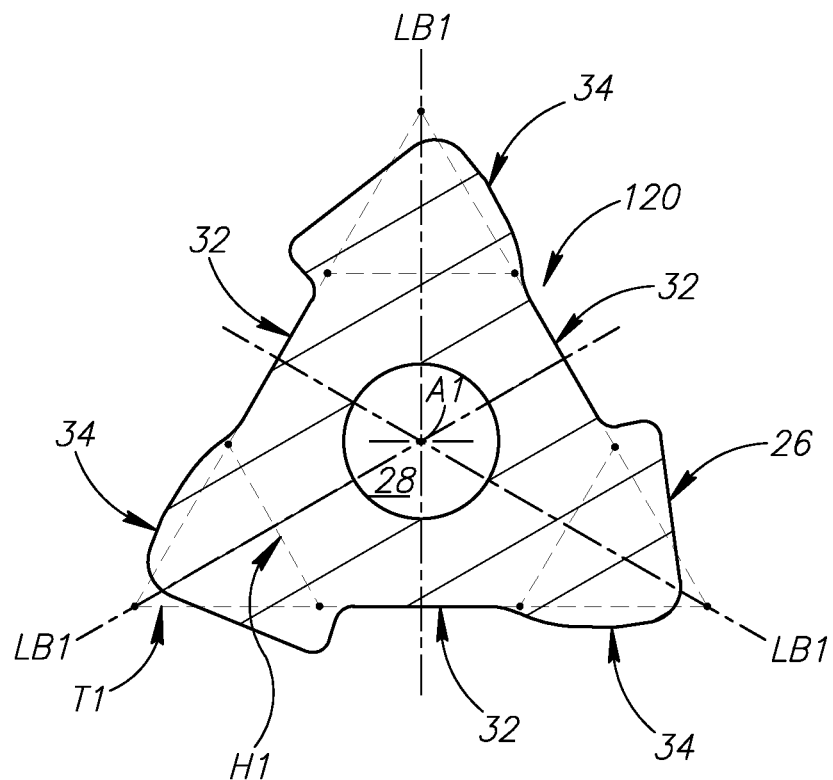
FIG. 13 is a cross-sectional view of the cutting insert shown in FIG. 11, taken along the line XIII-XIII.

As shown in FIGS. 5 and 13, in a cross-section taken in a second horizontal plane PH2 perpendicular to the central axis A1 and intersecting the three side surfaces 32, the three side surfaces 32 define three sides of a first imaginary triangle T1 and three non-adjacent sides of a first imaginary hexagon H1.

Also, as shown in FIGS. 5 and 13, the first imaginary triangle T1 has three imaginary first bisector lines LB1, each imaginary first bisector line LB1 containing one of the first imaginary triangle's three corners and bisecting its non-adjacent (opposite) side.

It should be appreciated that the first imaginary triangle T1 is an equilateral triangle having its center contained in the central axis A1.

It should also be appreciated that the first imaginary hexagon H1 is a regular hexagon having its center contained in the central axis A1 and six sides of equal length.

Figure 2:
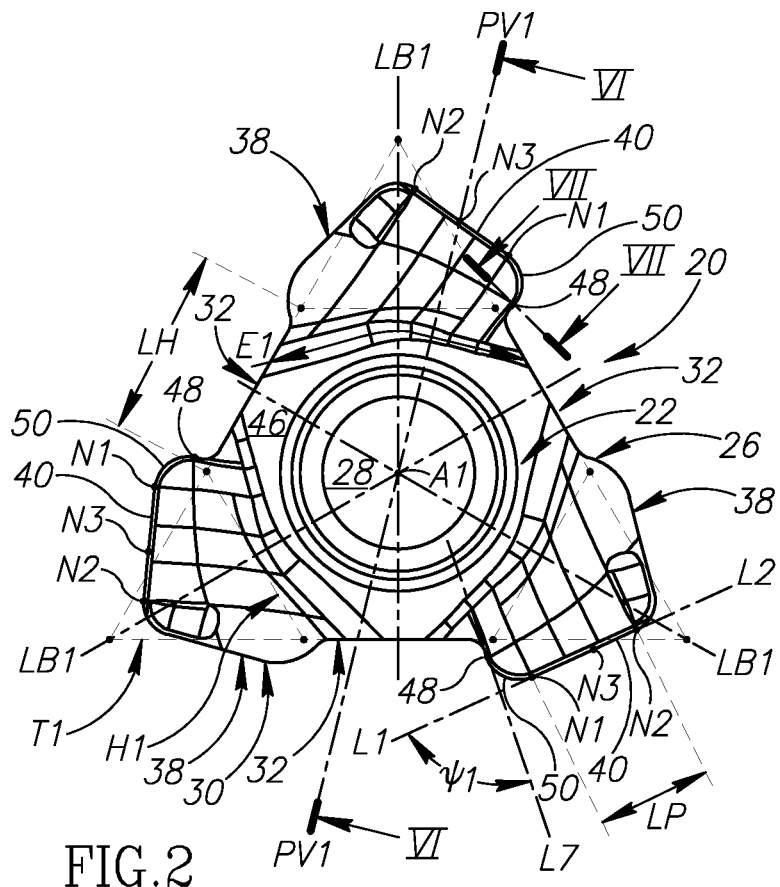
FIG. 2 is a top view of the cutting insert shown in FIG. 1.
Figure 10:
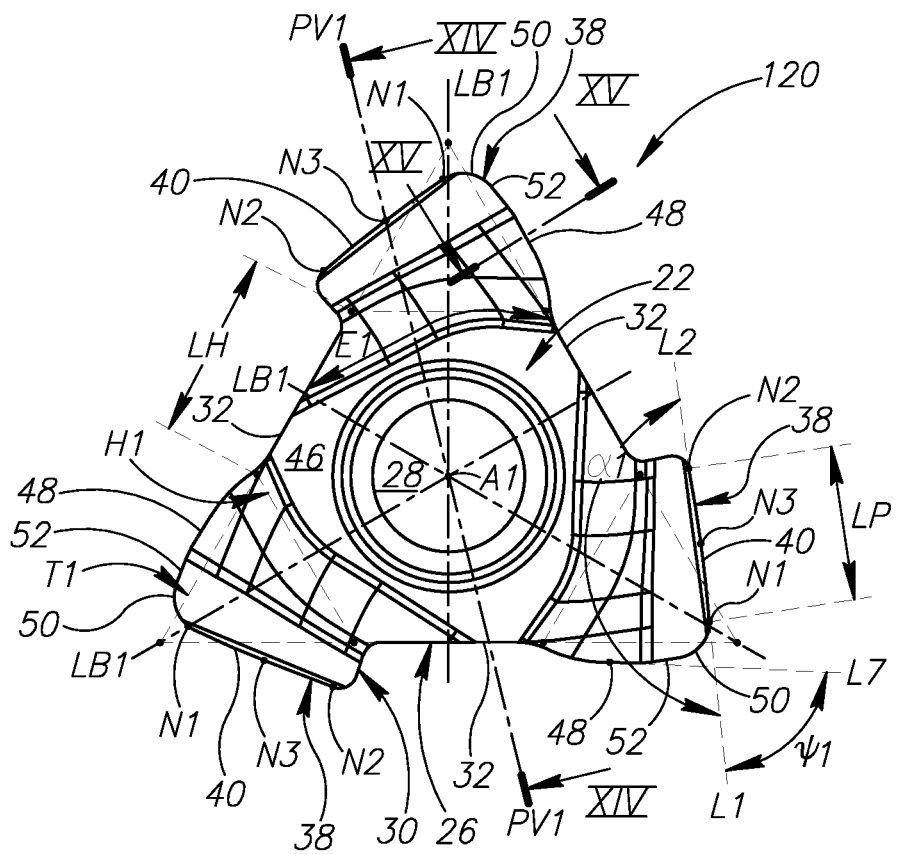
FIG. 10 is a top view of the cutting insert shown in FIG. 9.

According to the first aspect of the present invention, as shown in FIGS. 2 and 10, in a top view of the cutting insert 20, 120, each side of the first imaginary triangle T1 traverses two upper corner peripheral edges 38.

By virtue of each side of the first imaginary triangle T1 traversing two upper corner peripheral edges 38, the three side surfaces 32 are recessed, and thus provide a compact means for mounting the cutting insert 20, 120.

In some embodiments of the present invention, as shown in FIGS. 2 and 10, in the top view of the cutting insert 20, 120, the first imaginary triangle's three corners may be located outside the upper peripheral edge 30.

Also in some embodiments of the present invention, as shown in FIGS. 2 and 10, in the top view of the cutting insert 20, 120, each upper corner peripheral edge 38 may be traversed only once by the same side of the first imaginary triangle T1.

Further in some embodiments of the present invention, as shown in FIGS. 2 and 10, in the top view of the cutting insert 20, 120, the first imaginary hexagon's six corners may be located inside the upper peripheral edge 30.

It should be appreciated that for embodiments of the present invention in which the first imaginary hexagon's six corners are located inside the upper peripheral edge 30, the length of each upper corner peripheral edge 38 is advantageously increased.

In some embodiments of the present invention, as shown in FIGS. 2 and 10, in the top view of the cutting insert 20, 120, each imaginary first bisector line LB1 may intersect one of the upper corner peripheral edges 38, and each upper corner peripheral edge 38 may not exhibit mirror symmetry about its associated imaginary first bisector line LB1.

According to the first aspect of the present invention, as shown in FIGS. 2 and 10, in the top view of the cutting insert 20, 120, first and second imaginary straight lines L1, L2 tangential to each primary cutting edge 40 at its first and second end points N1, N2, respectively, are either collinear or form an obtuse primary bend angle $\alpha 1$ of greater than 175 degrees, i.e. $175° < \alpha 1 < 180°$.

For embodiments of the present invention in which the first and second imaginary straight lines L1, L2 are collinear, for example, in the top view of the first embodiment cutting insert 20 as shown in FIG. 2, each primary cutting edge 40 may be straight.

For embodiments of the present invention in which the first and second imaginary straight lines L1, L2 form an obtuse primary bend angle α1 of greater than 175 degrees, for example, in the top view of the second embodiment cutting insert 120 as shown in FIG. 10, each primary cutting edge 40 may be slightly convex.

It should be appreciated that each primary cutting edge 40 may be slightly convex in the top view of the second embodiment cutting insert 120, such that when the cutting insert 120 is inclined with respect to the workpiece, the operative primary cutting edge 40 is capable of milling a square shoulder therein.

According to the first aspect of the present invention, as shown in FIGS. 2 and 10, in the top view of the cutting insert 20, 120, each primary cutting edge 40 has a primary length LP between its first and second end points N1, N2 greater than half the hexagon side length LH of the first imaginary hexagon H1, i.e. LP>LH*½, and at least one side of the first imaginary triangle T1 traverses each primary cutting edge 40.

In some embodiments of the present invention, as shown in FIGS. 2 and 10, in the top view of the cutting insert 20, 120, the primary length LP may be greater than two-thirds of the hexagon side length LH, i.e. LP>LH*⅔.

Also in some embodiments of the present invention, as shown in FIGS. 2 and 10, in the top view of the cutting insert 20, 120, no portion of the cutting insert 20, 120 may be located outside the upper peripheral edge 30.

As shown in FIGS. 1, 2, 9 and 10, the upper surface 22 may include a rake surface 42 adjacent each primary cutting edge 40 and a chip deflection surface 44 between each rake surface 42 and a central top surface 46.

In some embodiments of the present invention, the central top surface 46 may entirely surround the central bore 28.

Also in some embodiments of the present invention, each chip deflection surface 44 may extend along a circumferential extent E1 of the top surface 46.

As shown in FIGS. 3 and 11, the top surface 46 may be planar and defined by a third horizontal plane PH3 perpendicular to the central axis A1.

In some embodiments of the present invention, no portion of the cutting insert 20, 120 may be located upward of the third horizontal plane PH3.

Also, as shown in FIGS. 3 and 11, a fourth horizontal plane PH4 perpendicular to the central axis A1 may intersect each chip deflection surface 44 along its entire circumferential extent E1, and not intersect any of the three primary cutting edges 40.

It should be appreciated that for embodiments of the present invention in which the fourth horizontal plane PH4 intersects each chip deflection surface 44 and none of the three primary cutting edges 40, each chip deflection surface 44 extends upward of its associated primary cutting edge 40, thus providing greater control of the flow of the chips.

In some embodiments of the present invention, each side surface 32 may intersect the top surface 46.

Figure 6:
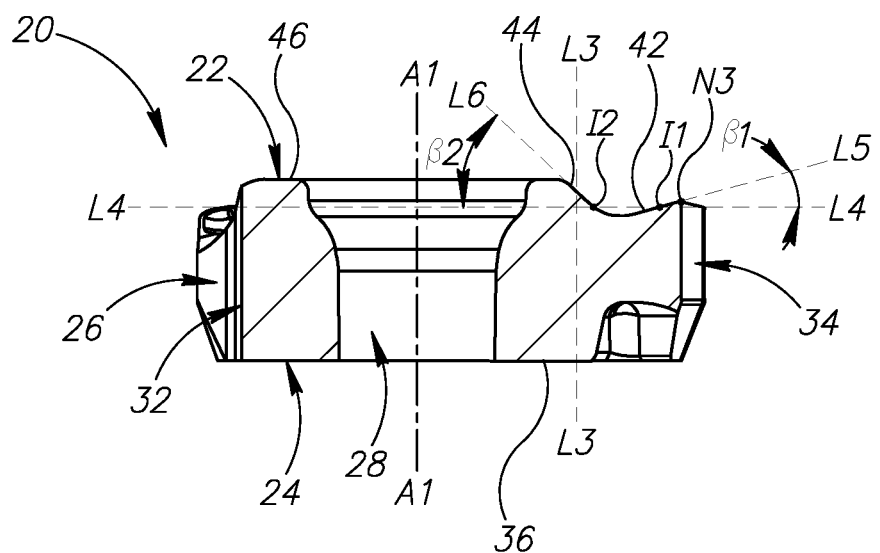
FIG. 6 is a cross-sectional view of the cutting insert shown in FIG. 2, taken along the line VI-VI.
Figure 14:
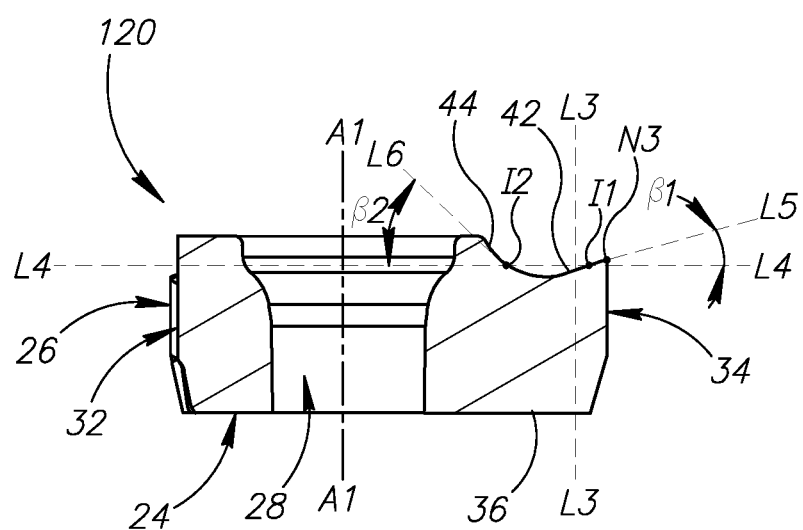
FIG. 14 is a cross-sectional view of the cutting insert shown in FIG. 10, taken along the line XIV-XIV.

As shown in FIGS. 6 and 14, in a cross-section taken in a first vertical plane PV1 containing the central axis A1 and a mid-point N3 of one of the primary cutting edges 40, the rake surface 42 may slope downwardly away from the primary cutting edge 40, and the chip deflection surface 44 may slope upwardly towards the top surface 46.

It should be appreciated that in the top view of the cutting insert 20, 120, the mid-point N3 of each primary cutting edge 40 is equidistant from its associated first and second end points N1, N2.

In some embodiments of the present invention, as shown in FIGS. 6 and 14, in the cross-section taken in the first vertical plane PV1, a third imaginary straight line L3 parallel to the central axis A1 and intersecting the base surface 36 may intersect the rake surface 42 or the chip deflection surface 44.

As shown in FIG. 6, the third imaginary straight line L3 of the first embodiment cutting insert 20 intersects the chip deflection surface 44, and as shown in FIG. 14, the third imaginary straight line L3 of the second embodiment cutting insert 120 intersects the rake surface 42.

In some embodiments of the present invention, as shown in FIGS. 2 and 10, in the top view of the cutting insert 20, 120, each chip deflection surface 44 may be at least partially located inside the first imaginary hexagon H1.

It should be appreciated that for embodiments of the present invention in which each chip deflection surface 44 is at least partially located inside the first imaginary hexagon H1, the circumferential extent E1 of each chip deflection surface 44 may advantageously exceed the hexagon side length LH, thus providing greater control of the flow of the chips.

As shown in FIGS. 6 and 14, in the cross-section taken in the first vertical plane PV1, a fourth imaginary straight line L4 perpendicular to the central axis A1 may intersect the rake surface 42 and the chip deflection surface 44 at first and second intersections points I1, I2, respectively.

Also, as shown in FIGS. 6 and 14, in the cross-section taken in the first vertical plane PV1, a fifth imaginary straight line L5 tangential to the rake surface 42 at the first intersection point I1 may form an acute rake surface angle β1 with the fourth imaginary straight line L4, and a sixth imaginary straight line L6 tangential to the chip deflection surface 44 at the second intersection point I1 may form an acute deflection surface angle β2 with the fourth imaginary straight line L4.

In some embodiments of the present invention, the deflection surface angle β2 may be greater than the rake surface angle β1.

Also in some embodiments of the present invention, the deflection surface angle β2 may be at least 5 degrees greater than the rake surface angle β1, i.e. β2≥β1+5°.

As shown in FIGS. 1, 2, 9 and 10, each upper corner peripheral edge 38 may include a ramping cutting edge 48 and a curved corner cutting edge 50, and the ramping cutting edge 48 may be spaced apart from its associated primary cutting edge 40 by the curved corner cutting edge 50.

In some embodiments of the present invention, each curved corner cutting edge 50 may extend between the first end point N1 of its associated primary cutting edge 40 and its associated ramping cutting edge 48.

Also in some embodiments of the present invention, each primary cutting edge 40 may tangentially adjoin its associated curved corner cutting edge 50 at its first end point N1.

It should be appreciated that the rake surface 42 adjacent each primary cutting edge 40 may also be delimited by the ramping cutting edge 48 and the curved corner cutting edge 50 associated therewith.

As shown in FIGS. 2 and 10, in the top view of the cutting insert 20, 120, a seventh imaginary straight line L7 tangential to each ramping cutting edge 48 may form an acute ramp angle ψ1 with its associated first imaginary straight line L1.

In some embodiments of the present invention, the acute ramp angle ψ1 may be greater than 45 degrees, i.e. 45°<ψ1<90°.

Figure 9:
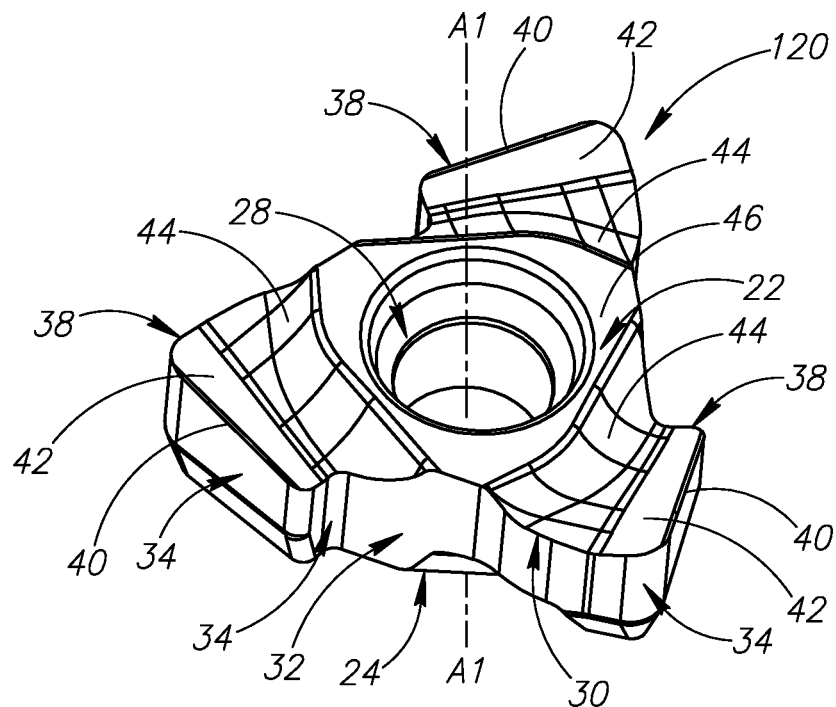
FIG. 9 is a perspective view of a cutting insert in accordance with a second embodiment of the present invention.

As shown in FIGS. 9 to 11, each upper corner peripheral edge 38 of the second embodiment cutting insert 120 may include a straight wiper edge 52 extending between its associated curved corner cutting edge 50 and its associated ramping cutting edge 48.

Each wiper edge 52 may tangentially adjoin its associated curved corner cutting edge 50.

Figure 7:
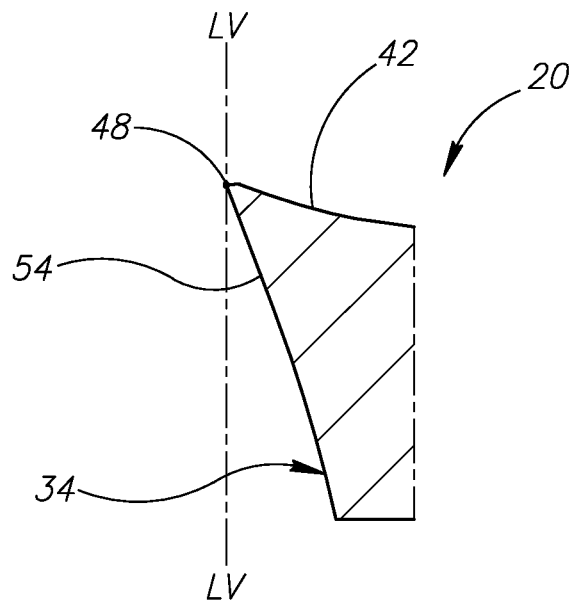
FIG. 7 is a partial cut view of the cutting insert shown in FIG. 2, taken along the line VII-VII.
Figure 15:
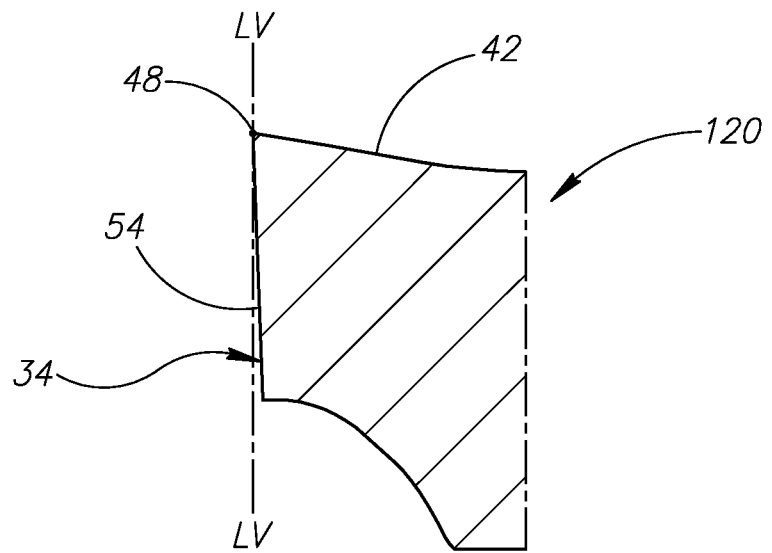
FIG. 15 is a partial cut view of the cutting insert shown in FIG. 10, taken along the line XV-XV.

As shown in FIGS. 7 and 15, in a partial cross-section taken along one of the ramping cutting edges 48, each corner surface 34 may include a positively inclined ramping relief surface 54 adjacent its associated ramping cutting edge 48.

It should be appreciated that the term "positively inclined" constitutes extension of the ramping relief surface 54 on the same side of a reference line LV parallel to the central axis A1 and containing the associated ramping cutting edge 48, as the adjacent rake surface 42.

In some embodiments of the present invention, the lower surface 24 may have three lower abutment recesses 56 circumferentially spaced around the base surface 36, and each lower abutment recess 56 may include a radially outward facing lower abutment surface 58.

Figure 8:
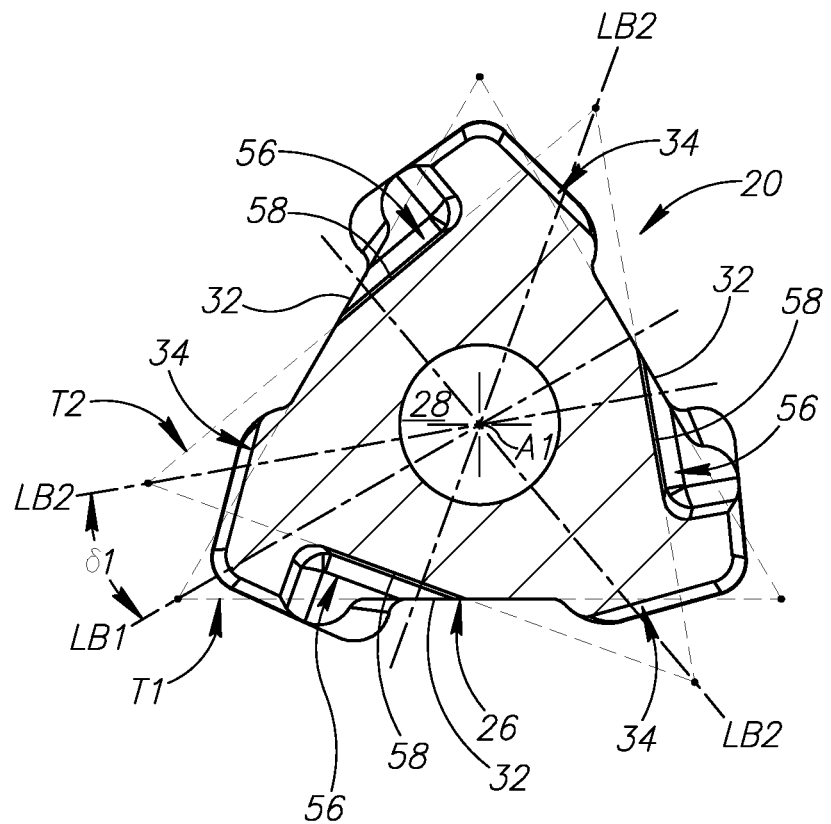
FIG. 8 is a cross-sectional view of the cutting insert shown in FIG. 3, taken along the line VIII-VIII.
Figure 16:
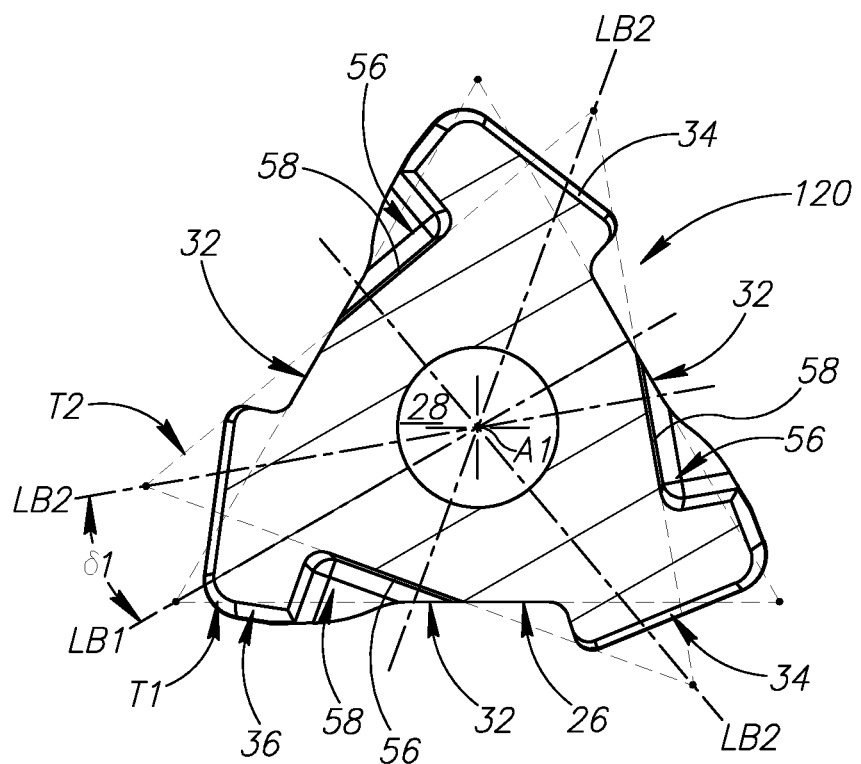
FIG. 16 is a cross-sectional view of the cutting insert shown in FIG. 11, taken along the line XVI-XVI.

As shown in FIGS. 8 and 16, in a cross-section taken in a fifth horizontal plane PH5 perpendicular to the central axis A1 and intersecting the three lower abutment surfaces 58, the three lower abutment surfaces 58 may define three sides of a second imaginary triangle T2.

Also, as shown in FIGS. 8 and 16, the second imaginary triangle T2 has three imaginary second bisector lines LB2, each imaginary second bisector line LB2 containing one of the second imaginary triangle's three corners and bisecting its non-adjacent side.

It should be appreciated that the second imaginary triangle T2 is an equilateral triangle having its center contained in the central axis A1.

In some embodiments of the present invention, each lower abutment surface 58 may intersect one of the three side surfaces 32.

Also in some embodiments of the present invention, each lower abutment surface 58 may be planar and non-parallel to the central axis A1.

Figure 4:
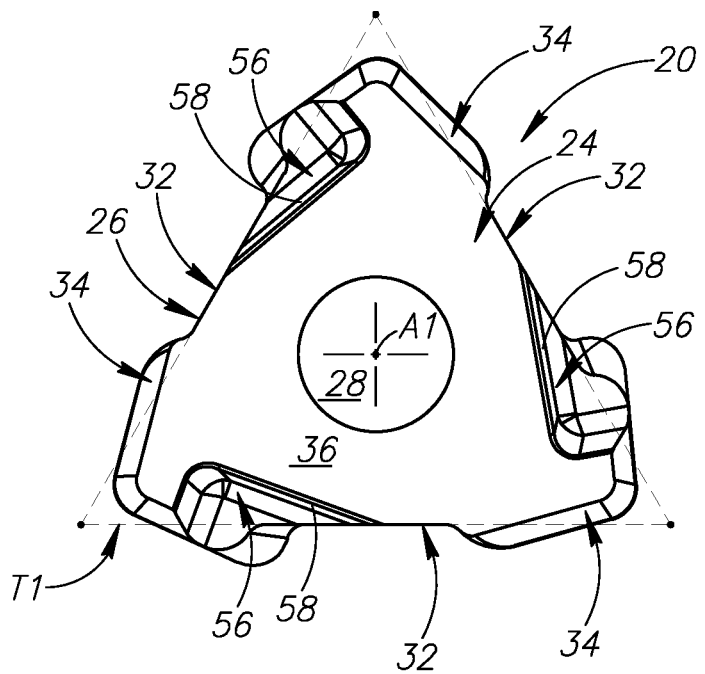
FIG. 4 is a bottom view of the cutting insert shown in FIG. 1.
Figure 12:
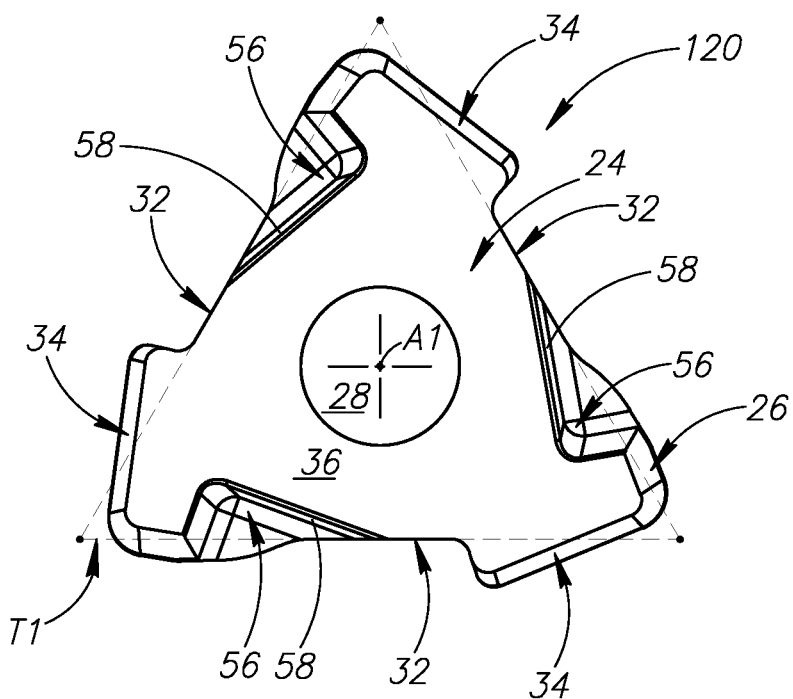
FIG. 12 is a bottom view of the cutting insert shown in FIG. 9.

As shown in FIGS. 4 and 12, in a bottom view of the cutting insert 20, 120, each lower abutment surface 58 may not extend outside the first imaginary triangle T1, thus providing a compact means for mounting the cutting insert 20, 120.

As shown in FIGS. 8 and 16, the first and second imaginary triangles T1, T2 may both be centered about the central axis A1. Additionally, the second imaginary triangle T2 may be rotationally offset from the first imaginary triangle T1 by an offset angle δ1, thus providing a wider range of mounting options when utilizing at least one of the three side surfaces 32 and at least one of the three lower abutment surfaces 58.

In some embodiments of the present invention, the offset angle δ1 may be less than or equal to 30 degrees, i.e. δ1≤30°.

Also in some embodiments of the present invention, the offset angle δ1 may be equal to or greater than 15 degrees and less than or equal to 30 degrees, i.e. 15°≤δ1≤30°.

As shown in FIGS. 17 to 20, an additional aspect of the present invention relates to a rotary cutting tool 60 comprising a cutting body 62 and at least one of the aforementioned indexable cutting inserts 20. Each cutting insert 20 is removably secured in an insert receiving pocket 64 of the cutting body 62.

Figure 17:
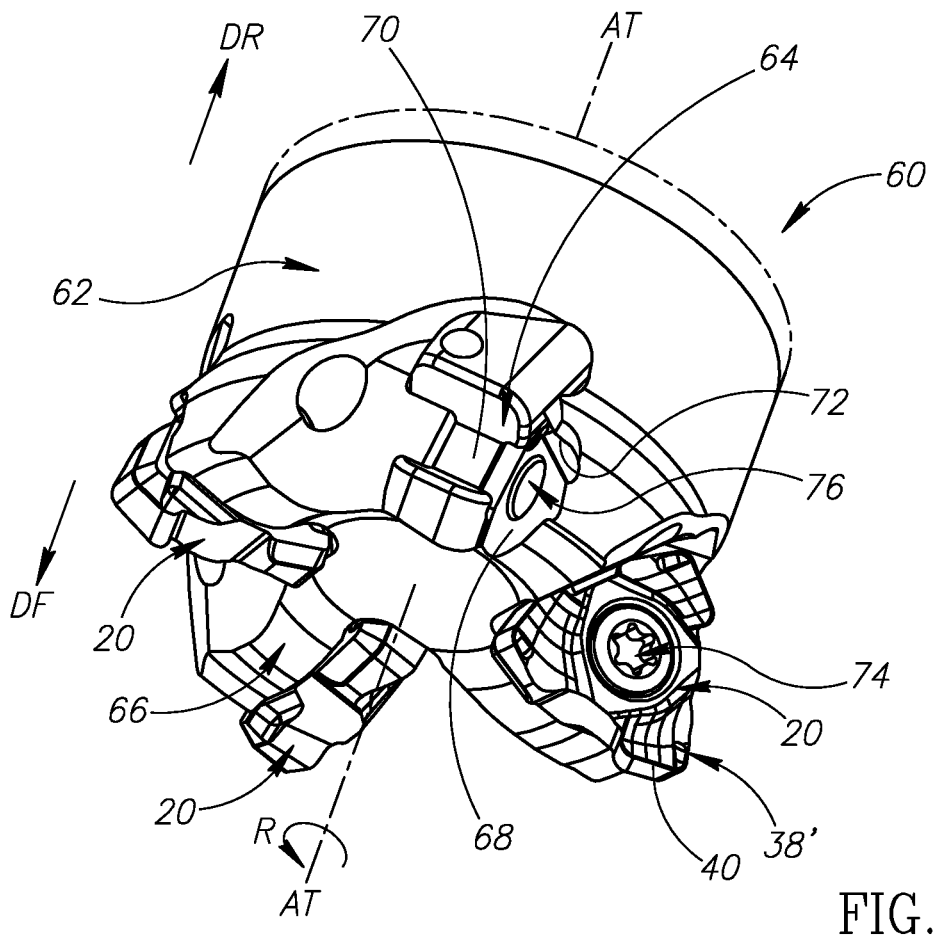
FIG. 17 is a perspective view of a cutting tool in accordance with some embodiments of the present invention, with one of its cutting inserts removed.
Figure 18:
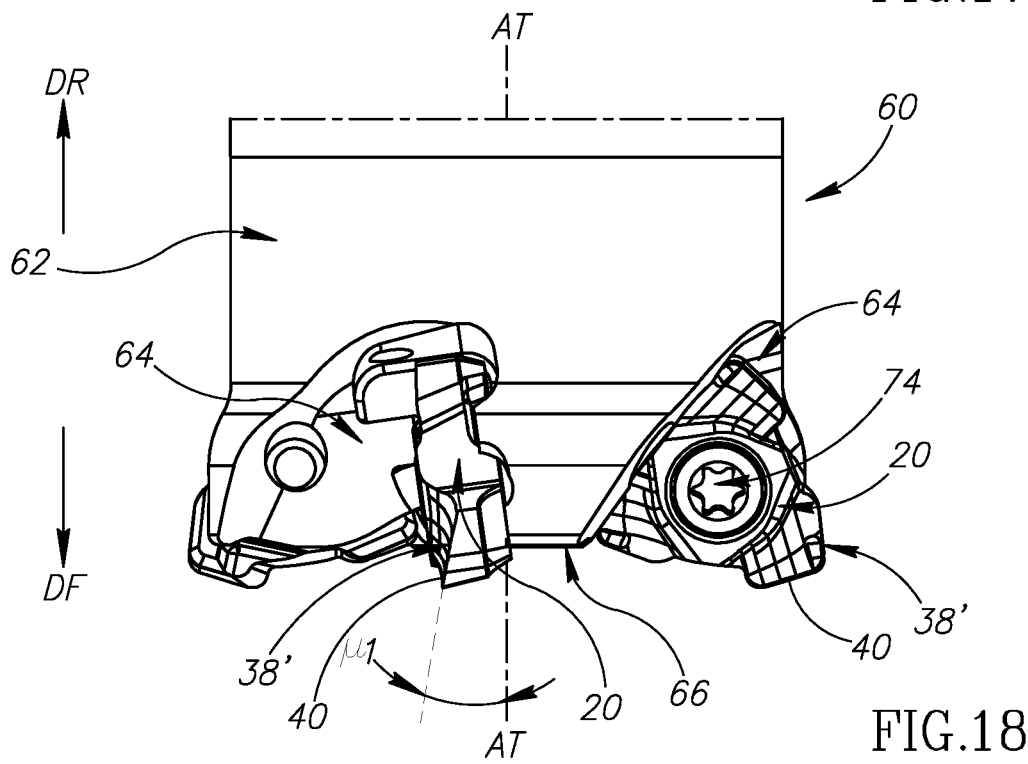
FIG. 18 is a side view of the cutting tool shown in FIG. 17.
Figure 19:
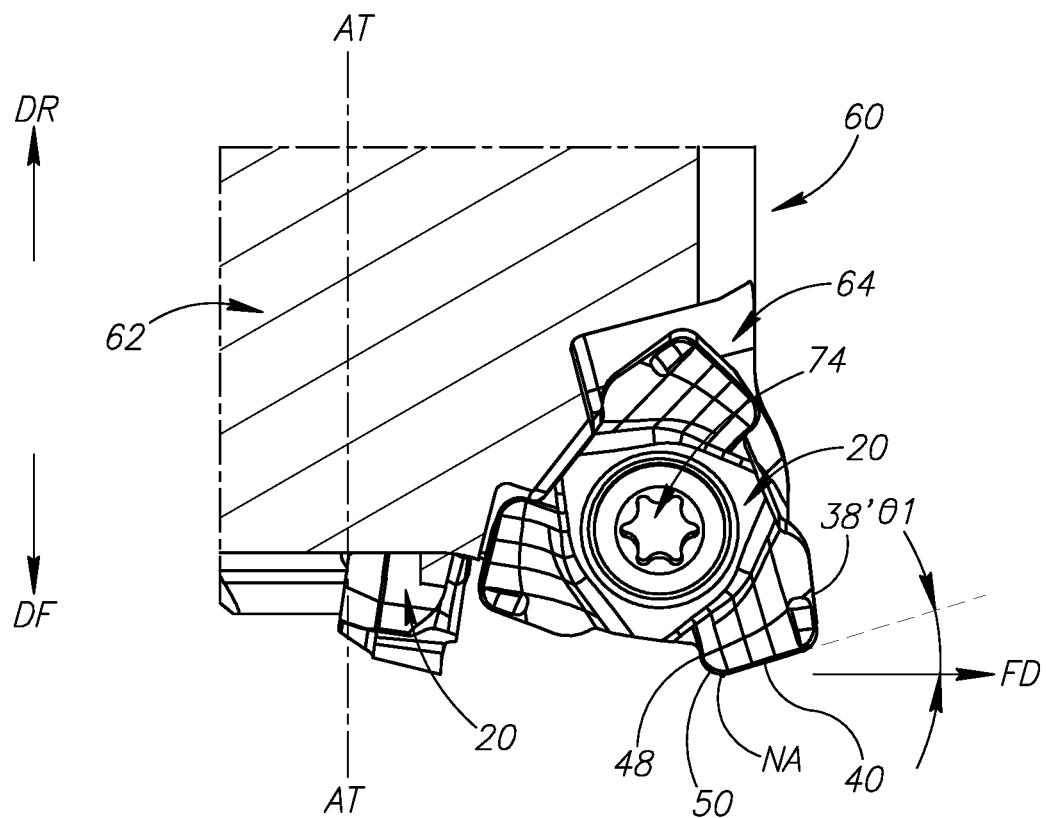
FIG. 19 is a detailed side view of the cutting tool shown in FIG. 17.

Although first embodiment cutting inserts 20 are retained in the rotary cutting tool 60 shown in FIGS. 17 to 19, it should be appreciated that second embodiment cutting inserts 120 are interchangeable therewith, by virtue of the versatile mounting means provided.

As shown in FIGS. 17 to 19, the cutting tool 60 may be rotatable about a tool axis AT defining a forward-rearward direction DF, DR, and each insert receiving pocket 64 may open out at a forward end surface 66 of the cutting body 62.

In some embodiments of the present invention, as shown in FIG. 19, only one of the three upper corner peripheral edges 38 of each cutting insert 20 may serve as an operative upper corner peripheral edge 38', and the operative upper corner peripheral edge 38' may contain an axially forward-most point NA of its associated upper peripheral edge 30.

Also in some embodiments of the present invention, the curved corner cutting edge 50 of the operative upper corner peripheral edge 38' may contain the axially forwardmost point NA. In other words, in the assembled cutting tool 60, the axially forwardmost point NA may be located on the curved corner cutting edge 50 associated with the operative upper corner peripheral edge 38'.

Further in some embodiments of the present invention, the primary cutting edge 40 and the ramping cutting edge 48 of the operative upper corner peripheral edge 38' may diverge in the rearward direction DR.

As shown in FIG. 19, the cutting tool 60 may be 'set-up' for cutting operations with a feed direction FD perpendicular to the tool axis AT, and the primary cutting edge 40 of the operative upper corner peripheral edge 38' may be inclined at a lead angle θ1 with respect to the feed direction FD.

In some embodiments of the present invention, the lead angle θ1 may be at least 10 degrees and at most 90 degrees, i.e. 10°≤θ1≤90°, thus providing for a wide range of milling operations.

For embodiments in which first embodiment cutting inserts 20 are retained in the rotary cutting tool 60, as shown in FIG. 19, the lead angle θ1 may be 15 degrees, i.e. θ1=15°.

For embodiments in which second embodiment cutting inserts 120 are retained in the rotary cutting tool 60 (not shown), the lead angle θ1 may be 90 degrees, i.e. θ1=90°.

It should be appreciated that for cutting operations in which the feed direction FD is perpendicular to the tool axis AT, the ramping cutting edge 48 of the operative upper corner peripheral edge 38' is inoperative.

It should also be appreciated that the ramping cutting edge 48 of the operative upper corner peripheral edge 38' becomes operative for cutting operations in which the feed direction FD is downwardly inclined from that shown in FIG. 18.

As shown in FIG. 18, the primary cutting edge 40 of the operative upper corner peripheral edge 38' may be inclined at a positive axial rake angle μ1 with respect to the tool axis AT.

Figure 20:
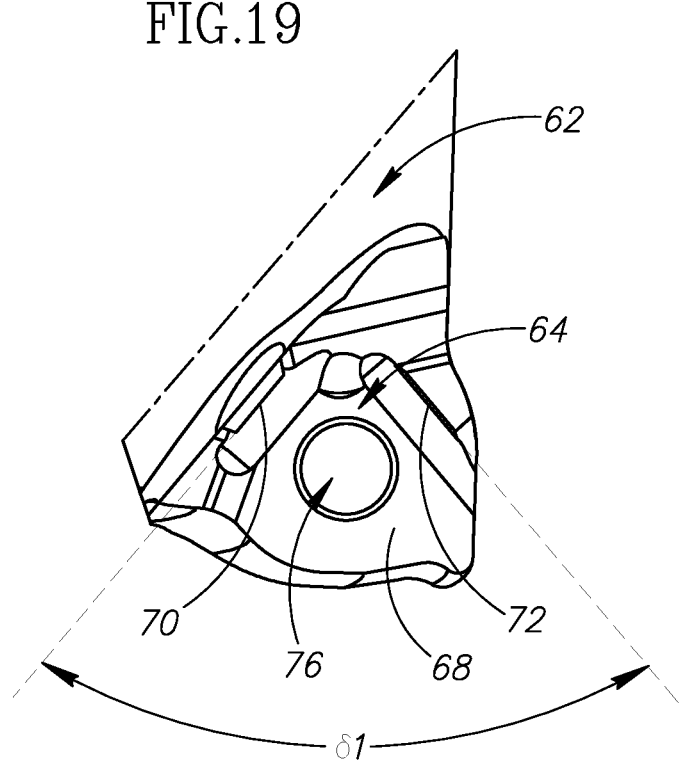
FIG. 20 is a front view of an insert receiving pocket of the cutting tool shown in FIG. 17, with its cutting insert removed.

As shown in FIGS. 17 and 20, each insert receiving pocket 64 may have a seat surface 68 and spaced apart first and second pocket walls 70, 72 transverse to the seat surface 68.

In some embodiments of the present invention, the first pocket wall 70 may face radially outwardly and oppose radial cutting forces acting on the operative upper corner peripheral edge 38'.

Also in some embodiments of the present invention, the second pocket wall 72 may face axially forwardly and oppose axial cutting forces acting on the operative upper corner peripheral edge 38'.

As shown in FIG. 17, the first and second pocket walls 70, 72 of each insert receiving pocket 64 may diverge in the forward direction DF.

Also, as shown in FIG. 17, the tool axis AT may define a direction of rotation R, and the seat surface 68 of each insert receiving pocket 64 may face the direction of rotation R.

In some embodiments of the present invention, the seat surface 68 may be planar.

In other embodiments of the present invention (not shown), the seat surface 68 may include a plurality of coplanar seat sub-surfaces.

Also in some embodiments of the present invention, each cutting insert 20 may be removably secured in its respective insert receiving pocket 64 by means of a clamping screw 74 extending through the central bore 28 and engaging a threaded bore 76 in the seat surface 68.

In a front view of the insert receiving pocket 64, as shown in FIG. 20, the first and second pocket walls 70, 72 may form an external pocket angle σ1.

It should be appreciated that use of the term "external angle" throughout the description and claims refers to an angle between two planar surface components as measured external to the member on which these surface components are formed.

In some embodiments of the present invention, the pocket angle σ1 may be greater than 60 degrees and less than or equal to 90 degrees, i.e. 60°<σ1≤90°, thus enabling the cutting insert 20, to be mounted in the insert receiving pocket 64 with a high level of stability.

Also in some embodiments of the present invention, the pocket angle σ1 may be equal to or greater than 75 degrees and less than or equal to 90 degrees, i.e. 75°<σ1≤90°

For each index position of each cutting insert 20 in its respective insert receiving pocket 64:
the insert's base surface 36 may make contact with the seat surface 68,
only one of the insert's three side surfaces 32 may be an operative side surface 32', and make contact with the first pocket wall 70, and
only one of the insert's three lower abutment surfaces 58 may be an operative lower abutment surface 58', and make contact with the second pocket wall 72.

Apart from these said instances of contact, each cutting insert 20 may make no additional contact with its respective insert receiving pocket 64.

In some embodiments of the present invention, the operative side surface 32' may not be circumferentially adjacent the corner surface 34 which intersects the upper surface 22 to form the operative upper corner peripheral edge 38'.

Figure 21:
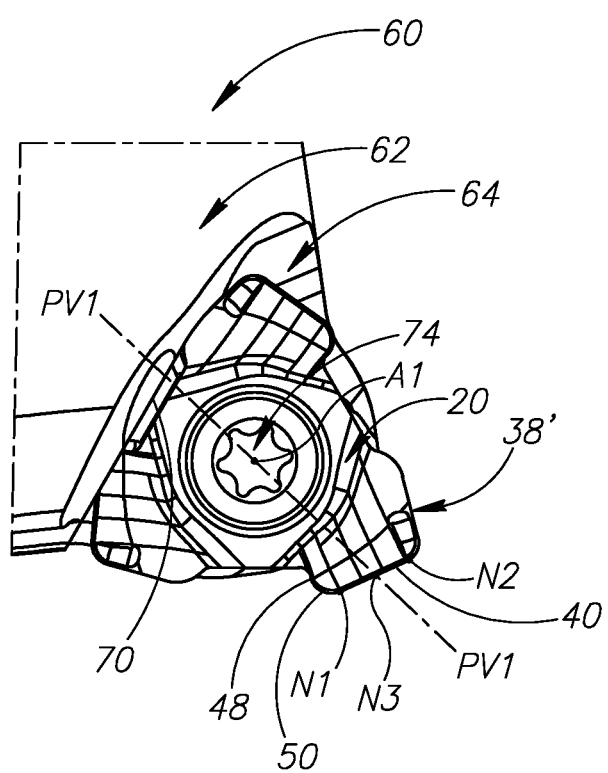
FIG. 21 is a front view of the insert receiving pocket shown in FIG. 20, with its cutting insert secured.

Also in some embodiments of the present invention, as shown in FIG. 21, the first vertical plane PV1 associated with the operative upper corner peripheral edge 38' may intersect the first pocket wall 70, such that a first pocket wall reaction force opposing the radial cutting forces is advantageously directed through the central axis A1 and the clamping screw 74.

Although the present invention has been described to a certain degree of particularity, it should be understood that various alterations and modifications could be made without departing from the spirit or scope of the invention as hereinafter claimed.

What is claimed is:

1. An indexable triangular-shaped cutting insert (20, 120) comprising:
opposing upper and lower surfaces (22, 24) with a peripheral surface (26) extending therebetween and a central axis (A1) extending therethrough,
the lower surface (24) having a downward facing planar base surface (36) defined by a first horizontal plane (PH1) perpendicular to the central axis (A1),
the peripheral surface (26) intersecting the upper surface (22) to form a continuous upper peripheral edge (30), and having three side surfaces (32) circumferentially alternating with three corner surfaces (34), each corner surface (34) intersecting the upper surface (22) to form an upper corner peripheral edge (38), and each upper corner peripheral edge (38) having a primary cutting edge (40) extending from a first end point (N1) to a second end point (N2),
wherein in a cross-section taken in a second horizontal plane (PH2) perpendicular to the central axis (A1) and intersecting the three side surfaces (32), the three side surfaces (32) define three sides of a first imaginary triangle (T1) and three non-adjacent sides of a first imaginary hexagon (H1), and
wherein in a top view of the cutting insert (20, 120):
each side of the first imaginary triangle (T1) traverses two upper corner peripheral edges (38),
first and second imaginary straight lines (L1, L2) tangential to each primary cutting edge (40) at its first and second end points (N1, N2), respectively, are either collinear or form an obtuse primary bend angle (α1) of greater than 175 degrees,
each primary cutting edge (40) has a primary length (LP) between its first and second end points (N1, N2) greater than half the hexagon side length (LH) of the first imaginary hexagon (H1), and
at least one side of the first imaginary triangle (T1) traverses each primary cutting edge (40).

2. The cutting insert (20, 120) according to claim 1, wherein in the top view of the cutting insert (20, 120):
the first imaginary triangle's three corners are located outside the upper peripheral edge (30).

3. The cutting insert (20, 120) according to claim 1, wherein in the top view of the cutting insert (20):
the first imaginary hexagon's six corners are located inside the upper peripheral edge (30).

4. The cutting insert (20, 120) according to claim 1, wherein:
the first imaginary triangle (T1) has three imaginary first bisector lines (LB1), each imaginary first bisector line (LB1) containing one of the first imaginary triangle's three corners and bisecting its non-adjacent side, and
wherein in the top view of the cutting insert (20, 120):
each imaginary first bisector line (LB1) intersects one of the upper corner peripheral edges (38), and
each upper corner peripheral edge (38) does not exhibit mirror symmetry about its associated imaginary first bisector line (LB1).

5. The cutting insert (20, 120) according to claim 1, wherein:
each primary cutting edge (40) slopes downwardly from its first end point (N1) to its second end point (N2).

6. The cutting insert (20, 120) according to claim 1, wherein:
the primary length (LP) is greater than two-thirds of the hexagon side length (LH).

7. The cutting insert (20, 120) according to claim 1, wherein in the top view of the cutting insert (20, 120):
each upper corner peripheral edge (38) is traversed only once by the same side of the first imaginary triangle (T1).

8. The cutting insert (20, 120) according to claim 1, wherein:
the upper surface (22) includes a rake surface (42) adjacent each primary cutting edge (40) and a chip deflection surface (44) between each rake surface (42) and a central top surface (46).

9. The cutting insert (20, 120) according to claim 8, wherein:
a central bore (28) coaxial with the central axis (A1) intersects the upper and lower surfaces (22, 24), and
the top surface (46) entirely surrounds the central bore (28).

10. The cutting insert (20, 120) according to claim 8, wherein in the top view of the cutting insert (20, 120):
each chip deflection surface (44) is at least partially located inside the first imaginary hexagon (H1).

11. The cutting insert (20, 120) according to claim 8, wherein:
the top surface (46) is planar and defined by a third horizontal plane (PH3) perpendicular to the central axis (A1).

12. The cutting insert (20, 120) according to claim 11, wherein:
no portion of the cutting insert (20, 120) is located upward of the third horizontal plane (PH3).

13. The cutting insert (20, 120) according to claim 8, wherein in a cross-section taken in a first vertical plane (PV1) containing the central axis (A1) and a mid-point (N3) of one of the primary cutting edges (40):
the rake surface (42) slopes downwardly away from the primary cutting edge (40), and
the chip deflection surface (44) slopes upwardly towards the top surface (46).

14. The cutting insert (20, 120) according to claim 13, wherein in the cross-section taken in the first vertical plane (PV1):
a fourth imaginary straight line (L4) perpendicular to the central axis (A1) intersects the rake surface (42) and the chip deflection surface (44) at first and second intersections points (I1, I2), respectively,
a fifth imaginary straight line (L5) tangential to the rake surface (42) at the first intersection point (I1) forms an acute rake surface angle ($\beta$1) with the fourth imaginary straight line (L4),
a sixth imaginary straight line (L6) tangential to the chip deflection surface (44) at the second intersection point (I1) forms an acute deflection surface angle ($\beta$2) with the fourth imaginary straight line (L4), and
the deflection surface angle ($\beta$2) is greater than the rake surface angle ($\beta$1).

15. The cutting insert (20, 120) according to claim 14, wherein:
the deflection surface angle ($\beta$2) is at least 5 degrees greater than the rake surface angle ($\beta$1).

16. The cutting insert (20, 120) according to claim 1, wherein:
each upper corner peripheral edge (38) includes a ramping cutting edge (48) and a curved corner cutting edge (50), and
each curved corner cutting edge (50) extends between the first end point (N1) of its associated primary cutting edge (40) and its associated ramping cutting edge (48).

17. The cutting insert (20, 120) according to claim 16, wherein in the top view of the cutting insert (20, 120):
a seventh imaginary straight line (L7) tangential to each ramping cutting edge (48) forms an acute ramp angle ($\psi$1) with its associated first imaginary straight line (L1), and
the acute ramp angle ($\psi$1) is greater than 45 degrees.

18. A rotary cutting tool (60) rotatable about a tool axis (AT) defining a forward-rearward direction (DF, DR), and comprising:
a cutting body (62) having at least one insert receiving pocket (64); and
at least one cutting insert (20, 120) in accordance with claim 1 removably secured in the insert receiving pocket (64).

19. The rotary cutting tool (60) according to claim 18, wherein:
each insert receiving pocket (64) opens out at a forward end surface (66) of the cutting body (62), and
only one of the three upper corner peripheral edges (38) of the at least one cutting insert (20, 120) serves as an operative upper corner peripheral edge (38'), containing an axially forwardmost point (NA) of its associated upper peripheral edge (30).

20. The rotary cutting tool (60) according to claim 19, wherein:
each upper corner peripheral edge (38) includes a ramping cutting edge (48) and a curved corner cutting edge (50),
the ramping cutting edge (48) is spaced apart from its associated primary cutting edge (40) by the curved corner cutting edge (50), and
the axially forwardmost point (NA) is located on the curved corner cutting edge (50) of the operative upper corner peripheral edge (38').

21. The rotary cutting tool (60) according to claim 20, wherein:
the primary cutting edge (40) and the ramping cutting edge (48) of the operative upper corner peripheral edge (38') diverge in the rearward direction (DR).

22. The rotary cutting tool (60) according to claim 19, wherein:
each insert receiving pocket (64) has a seat surface (68) and first and second pocket walls (70, 72) transverse to the seat surface (68), the first and second pocket walls (70, 72) forming an external pocket angle ($\sigma$1) in a front view of the insert receiving pocket (64), and
the insert's lower surface (24) has three lower abutment recesses (56) circumferentially spaced around the base surface (36), each lower abutment recess (56) including a radially outward facing lower abutment surface (58), and wherein:
the insert's base surface (36) makes contact with the seat surface (68),
only one of the insert's three side surfaces (32) is an operative side surface (32'), making contact with the first pocket wall (70), and
only one of the insert's three lower abutment surfaces (58) is an operative lower abutment surface (58'), making contact with the second pocket wall (72).

23. The rotary cutting tool (60) according to claim 19, wherein:
the pocket angle ($\sigma$1) is greater than 60 degrees and less than or equal to 90 degrees.

24. The rotary cutting tool (60) according to claim 19, wherein:
a first vertical plane (PV1) containing the central axis (A1) and a mid-point (N3) of the primary cutting edge (40) of the operative upper corner peripheral edge (38') intersects the first pocket wall (70).

\* \* \* \* \*